United States Patent
Kim

(10) Patent No.: US 11,494,313 B2
(45) Date of Patent: Nov. 8, 2022

(54) CACHE MEMORY INCLUDING DEDICATED AREAS, STORAGE DEVICE AND METHOD FOR STORING DATA IN THE DEDICATED AREAS OF THE CACHE MEMORY

(71) Applicant: SK hynix Inc., Icheon (KR)

(72) Inventor: Do Hun Kim, Icheon (KR)

(73) Assignee: SK hynix Inc., Icheon (KR)

( * ) Notice: Subject to any disclaimer, the term of this patent is extended or adjusted under 35 U.S.C. 154(b) by 27 days.

(21) Appl. No.: 16/997,853

(22) Filed: Aug. 19, 2020

(65) Prior Publication Data
US 2021/0318963 A1    Oct. 14, 2021

(30) Foreign Application Priority Data

Apr. 13, 2020 (KR) .................. 10-2020-0044768

(51) Int. Cl.
G06F 12/1009 (2016.01)

(52) U.S. Cl.
CPC .... G06F 12/1009 (2013.01); *G06F 2212/608* (2013.01); *G06F 2212/657* (2013.01)

(58) Field of Classification Search
CPC .......... G06F 12/1009; G06F 2212/608; G06F 2212/657; G06F 2212/282; G06F 12/0871; G06F 12/0864; G06F 2212/1016; G06F 2212/283; G06F 2212/313; G06F 2212/7201; G06F 2212/7203; G06F 2212/7208; G06F 12/0246; G06F 12/0882; G06F 12/0875; G06F 12/1027; G06F 2212/1024
See application file for complete search history.

(56) References Cited

U.S. PATENT DOCUMENTS

| | | | |
|---|---|---|---|
| 5,509,132 A | 4/1996 | Matsuda et al. | |
| 5,604,753 A | 2/1997 | Bauer et al. | |
| 6,000,006 A * | 12/1999 | Bruce ................. | G06F 12/0802 714/E11.038 |
| 6,324,620 B1 | 11/2001 | Christenson et al. | |
| 6,330,556 B1 | 12/2001 | Chilimbi et al. | |
| 6,658,533 B1 | 12/2003 | Bogin et al. | |
| 8,046,551 B1 | 10/2011 | Sahin | |

(Continued)

FOREIGN PATENT DOCUMENTS

KR   102000-0063081 A   10/2000
KR      10-0293276 B1    9/2001

(Continued)

OTHER PUBLICATIONS

Office Action dated Sep. 29, 2021 for U.S. Appl. No. 16/991,752.

(Continued)

*Primary Examiner* — Sean D Rossiter

(57) ABSTRACT

A storage device having improved operation speed may include a main memory configured to store first to N-th meta data, a cache memory including first to N-th dedicated areas respectively corresponding to areas in which the first to N-th meta data are stored, and a processor configured to store data accessed according to requests provided from a host among the first to N-th meta data in the first to N-th dedicated areas, respectively. A size of the first to N-th dedicated areas may be determined according to the number of times each of the first to N-th meta data is accessed by the requests.

19 Claims, 13 Drawing Sheets

(56) References Cited

U.S. PATENT DOCUMENTS

| | | |
|---|---|---|
| 8,909,860 B2 | 12/2014 | Rao |
| 9,026,737 B1 | 5/2015 | Armangau et al. |
| 2009/0300293 A1 | 12/2009 | Mantor et al. |
| 2011/0022779 A1 | 1/2011 | Lund et al. |
| 2011/0047437 A1 | 2/2011 | Flynn |
| 2011/0072196 A1 | 3/2011 | Forhan et al. |
| 2012/0096059 A1 | 4/2012 | Shimizu et al. |
| 2012/0096217 A1 | 4/2012 | Son et al. |
| 2012/0144448 A1 | 6/2012 | Gunawardena et al. |
| 2012/0166723 A1 | 6/2012 | Araki et al. |
| 2013/0124794 A1 | 5/2013 | Bux et al. |
| 2013/0205097 A1 | 8/2013 | Flynn et al. |
| 2014/0059275 A1 | 2/2014 | Yun et al. |
| 2014/0258628 A1 | 9/2014 | Shivashankaraiah et al. |
| 2014/0281806 A1 | 9/2014 | Sharon et al. |
| 2014/0297603 A1 | 10/2014 | Kim et al. |
| 2015/0347314 A1 | 12/2015 | Lee |
| 2015/0356019 A1 | 12/2015 | Johar et al. |
| 2015/0370734 A1 | 12/2015 | Mangano et al. |
| 2016/0006461 A1 | 1/2016 | Yin et al. |
| 2016/0070472 A1 | 3/2016 | Takizawa et al. |
| 2016/0162416 A1 | 6/2016 | Boyd et al. |
| 2016/0179402 A1 | 6/2016 | Iwashiro et al. |
| 2016/0328161 A1 | 11/2016 | Huang et al. |
| 2017/0031615 A1 | 2/2017 | Lee |
| 2017/0031626 A1 | 2/2017 | Kim et al. |
| 2017/0131951 A1 | 5/2017 | Miura |
| 2017/0242752 A1 | 8/2017 | Lee |
| 2017/0242785 A1 | 8/2017 | O'Krafka et al. |
| 2018/0004698 A1 | 1/2018 | Brouwer et al. |
| 2018/0006963 A1 | 1/2018 | Brouwer et al. |
| 2018/0130537 A1 | 5/2018 | Kim et al. |
| 2018/0253353 A1 | 9/2018 | Takase |
| 2018/0374550 A1 | 12/2018 | Barndt et al. |
| 2019/0129971 A1 | 5/2019 | Hironaka et al. |
| 2019/0340070 A1 | 11/2019 | Lien et al. |
| 2020/0019499 A1 | 1/2020 | Yamaguchi |
| 2020/0098420 A1* | 3/2020 | Li .................... G06F 3/0619 |
| 2020/0192826 A1* | 6/2020 | Ben-Simon ........... G06F 3/0614 |
| 2020/0310984 A1 | 10/2020 | Choi et al. |
| 2021/0224187 A1* | 7/2021 | Um .................... G06F 12/0882 |
| 2021/0318963 A1* | 10/2021 | Kim .................... G06F 12/0871 |
| 2021/0365207 A1* | 11/2021 | Lee .................... G06F 3/0679 |
| 2021/0365372 A1* | 11/2021 | Kim .................... G06F 12/0804 |

FOREIGN PATENT DOCUMENTS

| | | |
|---|---|---|
| KR | 1020070116792 A | 12/2007 |
| KR | 10-1014040 B1 | 2/2011 |
| KR | 1020140055737 A | 5/2014 |
| KR | 10-2015-0138713 A | 12/2015 |
| KR | 10-2016-0035737 A | 4/2016 |
| KR | 10-1711945 B1 | 3/2017 |
| KR | 10-2017-0070920 A | 6/2017 |
| KR | 10-1790165 B1 | 11/2017 |
| KR | 10-1858159 B1 | 6/2018 |
| KR | 10-2018-0104830 A | 9/2018 |
| KR | 10-2019-0054974 A | 5/2019 |
| KR | 10-1992934 B1 | 6/2019 |
| KR | 10-2019-0082584 A | 7/2019 |
| KR | 10-2002925 B1 | 7/2019 |
| KR | 102019-0090635 A | 8/2019 |
| KR | 10-2019-0067088 A | 4/2020 |
| KR | 102020-0035311 A | 4/2020 |
| KR | 1020200095103 A | 8/2020 |

OTHER PUBLICATIONS

Office Action dated Sep. 15, 2021 for U.S. Appl. No. 17/067,412.
Office Action dated Oct. 7, 2020 for U.S. Appl. No. 16/111,044.
Notice of allowance dated Feb. 4, 2022 for U.S. Appl. No. 17/067,412.
Non-Final Office Action for related U.S. Appl. No. 17/196,691, dated Mar. 24, 2022.
Final Office Action for related U.S. Appl. No. 17/196,691, dated Jul. 26, 2022.

* cited by examiner

Old Physical Address Valid Page Table

| bit1 | bit2 | bit3 | bit4 | bit5 | bit6 | bit7 | bit8 | bit9 | bit10 | ... |
|------|------|------|------|------|------|------|------|------|-------|-----|
| Set | Set | Clear | Clear | Clear | Clear | Set | Set | Set | Set | ... |

Old Physical Address Valid Page Table

| bit1 | bit2 | bit3 | bit4 | bit5 | bit6 | bit7 | bit8 | bit9 | bit10 | ... |
|------|------|------|------|------|------|------|------|------|-------|-----|
| Set | Set | Clear | Clear | Clear | Clear | Clear | Set | Set | Set | ... |

New Physical Address Valid Page Table

| bit1 | bit2 | bit3 | bit4 | bit5 | bit6 | bit7 | bit8 | bit9 | bit10 | ... |
|------|------|------|------|------|------|------|------|------|-------|-----|
| Clear | Clear | Clear | Clear | Clear | Clear | Clear | Clear | Clear | Clear | ... |

| bit1 | bit2 | bit3 | bit4 | bit5 | bit6 | bit7 | bit8 | bit9 | bit10 | ... |
|------|------|------|------|------|------|------|------|------|-------|-----|
| Set | Clear | Clear | Clear | Clear | Clear | Clear | Clear | Clear | Clear | ... |

CACHE MEMORY INCLUDING DEDICATED AREAS, STORAGE DEVICE AND METHOD FOR STORING DATA IN THE DEDICATED AREAS OF THE CACHE MEMORY

CROSS-REFERENCE TO RELATED APPLICATION

The present application claims priority under 35 U.S.C. § 119(a) to Korean patent application number 10-2020-0044768, filed on Apr. 13, 2020, in the Korean Intellectual Property Office, the entire disclosure of which is incorporated herein by reference.

BACKGROUND

1. Field of Invention

The present disclosure relates to an electronic device, and more particularly, to a storage device and a method of operating the same.

2. Description of Related Art

A storage device is a device that stores data under control of a host device such as a computer or a smartphone. A storage device may include a memory device storing data and a memory controller controlling the memory device. The memory device may include a volatile memory device, a non-volatile memory device, or both.

The volatile memory device may be a device that stores data only when power is supplied and loses the stored data when the power supply is cut off. The volatile memory device may include a static random access memory (SRAM), a dynamic random access memory (DRAM), and the like.

The non-volatile memory device is a device that does not lose data even though power is cut off. The non-volatile memory device include a read only memory (ROM), a programmable ROM (PROM), an electrically programmable ROM (EPROM), an electrically erasable and programmable ROM (EEPROM), a flash memory, and the like.

SUMMARY

An embodiment of the present disclosure provides a storage device having improved operation speed, and a method of operating the same.

A memory controller that controls a non-volatile memory according to an embodiment of the present disclosure may include a main memory configured to store map data and a valid page table, the map data including a correspondence relationship between a logical address provided by a host and a physical address of the memory device, and the valid page table including an indication of whether data stored at the physical address is valid data, a cache memory including first and second dedicated areas respectively corresponding to the map data and the valid page table and a processor configured to request from the main memory the map data corresponding to the logical address input according to a request of the host and the valid page table of the physical address corresponding to the logical address input according to the request of the host, wherein the map data corresponding to the logical address input according to the request of the host is cached in the first dedicated area and the valid page table of the physical address corresponding to the logical address input according to the request is cached in the second dedicated area.

A memory controller according to an embodiment of the present disclosure may include a main memory configured to store first meta data and second meta data, a cache memory including a first dedicated area and a second dedicated area respectively corresponding to the first meta data and the second meta data, and a processor configured to control the cache memory to store data accessed in response to a request from the host among the first meta data and the second meta data in the first dedicated area and the second dedicated area, respectively.

A storage device according to an embodiment of the present disclosure may include a main memory configured to store first to N-th meta data, a cache memory including first to N-th dedicated areas respectively corresponding to areas of the main memory in which the first to N-th meta data are stored and a processor configured to cache data accessed according to requests provided from a host among the first to N-th meta data in the first to N-th dedicated areas, respectively, wherein a size of the first to N-th dedicated areas is determined according to a number of times each of the first to N-th meta data will be accessed by the requests.

According to the present technology, a storage device having improved operation speed, and a method of operating the same are provided.

BRIEF DESCRIPTION OF THE DRAWINGS

FIG. 4 illustrates the read-modify-write of a valid page table (VPT) of an old physical address of FIG. 2.

FIG. 5 illustrates the read-modify-write of the VPT of a new physical address of FIG. 2.

DETAILED DESCRIPTION

Specific structural or functional descriptions of embodiments according to the concept which are disclosed in the present specification or application are illustrated only to describe the embodiments according to the concept of the present disclosure. The embodiments according to the concept of the present disclosure may be carried out in various forms and the descriptions are not limited to the embodiments described in the present specification or application.

Figure 1:
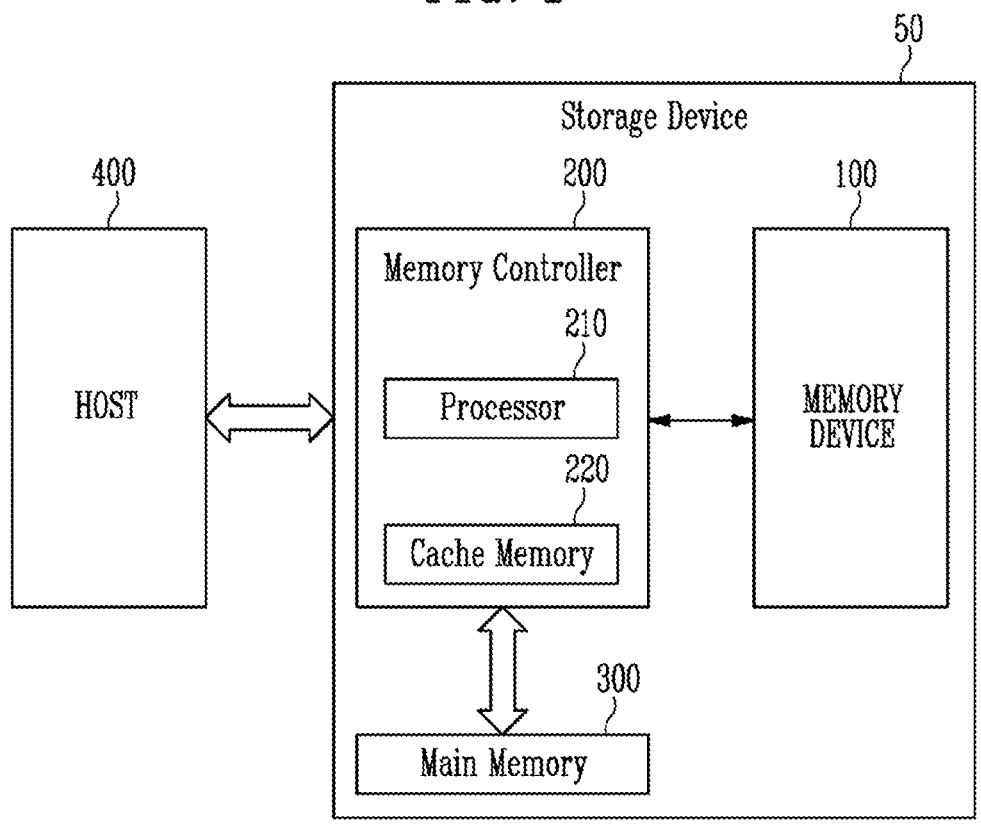
FIG. 1 illustrates a storage device according to an embodiment of the present disclosure.

FIG. 1 is a diagram of a storage device 50 according to an embodiment of the present disclosure.

The storage device 50 may include a memory device 100 and a memory controller 200 that controls an operation of the memory device. The storage device 50 may be a device that stores data under control of a host 400. The host 400 may be, for example, a cellular phone, a smartphone, an MP3 player, a laptop computer, a desktop computer, a game player, a TV, a tablet PC, or an in-vehicle infotainment system.

The storage device 50 may be manufactured as one of various types of storage devices according to a host interface that provides communications with the host 400. For example, the storage device 50 may be configured as any one of an SSD, a multimedia card in a form of an MMC, an eMMC, an RS-MMC and a micro-MMC, a secure digital card in a form of an SD, a mini-SD and a micro-SD, a universal serial bus (USB) storage device, a universal flash storage (UFS) device, a personal computer memory card international association (PCMCIA) card type storage device, a peripheral component interconnection (PCI) card type storage device, a PCI express (PCI-E) card type storage device, a compact flash (CF) card, a smart media card, and a memory stick.

The storage device 50 may be manufactured as any one of various types of packages. For example, the storage device 50 may be manufactured as any one of a package on package (POP), a system in package (SIP), a system on chip (SOC), a multi-chip package (MCP), a chip on board (COB), a wafer-level fabricated package (WFP), and a wafer-level stack package (WSP).

The memory device 100 may store data. The memory device 100 operates under control of the memory controller 200. The memory device 100 may include a memory cell array (not shown) including a plurality of memory cells that store data.

Each of the memory cells may be configured as a single level cell (SLC) that stores one data bit, a multi-level cell (MLC) that stores two data bits, a triple level cell (TLC) that stores three data bits, or a quad level cell (QLC) capable of storing four data bits.

The memory cell array (not shown) may include a plurality of memory blocks. A memory block may include a plurality of pages. In an embodiment, the page may be a unit for storing data in the memory device 100 or reading data stored in the memory device 100. The memory block may be a unit for erasing data in the memory device 100.

In an embodiment, the memory device 100 may include a double data rate synchronous dynamic random access memory (DDR SDRAM), a low power double data rate4 (LPDDR4) SDRAM, a graphics double data rate (GDDR) SDRAM, a low power DDR (LPDDR), a Rambus dynamic random access memory (RDRAM), a NAND flash memory, a vertical NAND flash memory, a NOR flash memory device, a resistive random access memory (RRAM), a phase-change random-access memory (PRAM), a magnetoresistive random access memory (MRAM), a ferroelectric random access memory (FRAM), a spin transfer torque random access memory (STT-RAM), or the like. In the present specification, for convenience of description, it is assumed that the memory device 100 includes a NAND flash memory.

The memory device 100 is configured to receive a command and an address from the memory controller 200 and access an area selected by an address in the memory cell array. The memory device 100 may perform an operation instructed by the command on the area selected by the address. For example, the memory device 100 may perform a write operation (program operation), a read operation, and an erase operation. During the program operation, the memory device 100 may program data in the area selected by the address. During the read operation, the memory device 100 may read data from the area selected by the address. During the erase operation, the memory device 100 may erase data stored in the area selected by the address.

The memory controller 200 may control an overall operation of the storage device 50.

When power is applied to the storage device 50, the memory controller 200 may execute firmware (FW). When the memory device 100 is a flash memory device, the firmware (FW) may include a host interface layer (HIL) that controls communication with the host 400, a flash translation layer (FTL) that controls communication between the memory controller 200 and the host 400, and a flash interface layer (FIL) that controls communication with the memory device 100.

In an embodiment, the memory controller 200 may receive data and a logical block address (LBA) from the host 300 and may convert the LBA into a physical block address (PBA) indicating an address of memory cells in which data included in the memory device 100 is stored or is to be stored. In the present specification, the LBA and a "logical address" may have the same meaning. In the present specification, the PBA and a "physical address" may have the same meaning.

The memory controller 200 may control the memory device 100 to perform the program operation, the read operation, or the erase operation according to a request of the host 400. During the program operation, the memory controller 200 may provide a write command, the PBA, and data to the memory device 100. During the read operation, the memory controller 200 may provide a read command and the PBA to the memory device 100. During the erase operation, the memory controller 200 may provide an erase command and the PBA to the memory device 100.

In an embodiment, the memory controller 200 may generate a command, an address, and data independently from a request from the host 400 and transmit the command, the address, and the data to the memory device 100. For example, the memory controller 200 may provide a command, an address, and data for performing a read operation and program operations to the memory device 100 in the course of performing wear leveling, read reclaim, garbage collection, and the like.

In an embodiment, the memory controller 200 may control two or more memory devices 100. In this case, the memory controller 200 may control the memory devices 100 according to an interleaving method to improve operation performance. The interleaving method may be a method of controlling operations for at least two memory devices 100 to overlap with each other.

The main memory 300 may temporarily store data provided from the host 400 or may temporarily store data read from the memory device 100. In an embodiment, the main memory 300 may be a volatile memory device. For example, the main memory 300 may be a dynamic random access memory (DRAM) or a static random access memory (SRAM).

In an embodiment, the main memory 300 may read meta data stored in the memory device 100 and store the read meta data.

The meta data may be data including various setting information required to control the storage device 50. For example, the meta data may include bad block data, which is information on a bad block among a plurality of memory blocks included in the memory device 100, and firmware data to be executed by a processor 210 of the memory controller 200.

In an embodiment, the meta data may include map data indicating a correspondence between a logical address provided by the host 400 and a physical address of memory cells included in the memory device 100 (i.e., logical-to-physical (L2P) map data), and include valid page table (VPT) data indicating whether data stored in pages included in the memory device 100 is valid data. In an embodiment, the valid page table data may be included in one or more valid page tables, wherein a valid page table may be data of a bitmap form, bits of the valid page table each indicating whether data stored in a corresponding page in a 4 KB unit of the memory device 100 is valid in a 4 KB unit.

In an embodiment, the meta data may also include read count data indicating the number of times of the read operations performed on the memory blocks included in the memory device 100, cycling data indicating the number of times of erasures of the memory blocks included in the memory device 100, hot/cold data indicating whether the data stored in the pages included in the memory device 100 is hot data or cold data, and journal data indicating a change content of the map data.

In an embodiment, the meta data stored in the main memory 300 may include data chunks having different types of data structures for each type. For example, the meta data may have different data sizes for each type thereof. Therefore, the size of the meta data stored in the main memory 300 may be different for each type thereof.

In an embodiment of the present disclosure, the memory controller 200 may include the processor 210 and a cache memory 220.

The processor 210 may control overall operations of the memory controller 200. The processor 210 may execute firmware (FW). The processor 210 may perform operations required to access the memory device 100. For example, the processor 210 may provide a command to the memory device 100 and control the memory device 100 and the main memory 300 to perform an operation corresponding to the command.

For example, when a write request is received from the host 400, the processor 210 may convert a logical address corresponding to the write request into a physical address, and may store map data indicating the correspondence relationship between the logical address and the physical address in the main memory 300.

In order to store the map data, the processor 210 may read a map segment from the main memory 300, the map segment including mapping information for the logical address provided by the host 400. Thereafter, the processor 210 may record the physical address corresponding to the logical address in the map segment, and store the map segment in which the physical address is recorded in the main memory 300 again.

In an embodiment, the map data stored in the main memory 300 may be updated. For example, when a write request including new data to be written to a logical address that was previously written to is received, the previously stored data for the logical address becomes invalid data, a physical address corresponding to the logical address may be changed, and the map data must be updated accordingly. Furthermore, when a position where data is stored is changed by various background operations such as garbage collection, read reclaim, and wear leveling, the map data may be updated. The update of the map data, that is, the map update, will be described later in more detail with reference to FIG. 2.

The cache memory 220 may store data accessed by the processor 210 from the main memory 300. A capacity of the cache memory 220 may be smaller than that of the main memory 300. In an embodiment, the cache memory 220 may be a volatile memory device. For example, the main memory 300 may be a dynamic random access memory (DRAM) or a static random access memory (SRAM). The cache memory 220 may be a memory having an operation speed faster than that of the main memory 300.

Since the capacity of the cache memory 220 is smaller than that of the main memory 300, the cache memory 220 may store meta data accessed by the processor 210 from among the meta data stored in the main memory 300. Storing data stored in a specific address from among the data stored in the main memory 300 in the cache memory 220 is referred to as caching.

When the cache memory 220 stores data to be accessed by the processor 210 from the main memory 300, the cache memory 220 may provide the corresponding data to the processor 210. Since the operation speed of the cache memory 220 is faster than that of the main memory 300, when the data to be accessed by the processor 210 is stored in the cache memory 220, the processor 210 may obtain the data faster than obtaining the data from the main memory 300. A case where the data to be accessed by the processor 210 is stored in the cache memory 220 is referred to as a cache hit, and a case where the data to be accessed by the processor 210 is not stored in the cache memory 220 is referred to as a cache miss. As the number of occurrences of the cache hit increases, a speed of an operation processed by the processor 210 may be increased.

The cache memory 220 may be classified as one of a direct mapped cache, a set associative cache, and a fully associative cache.

In a direct mapped cache, a plurality of locations in the main memory 300 have a many-to-one (n:1) correspondence to one location in the cache memory 220. That is, in the direct mapped cache, an address of the cache memory 220 in which data from a specific address of the main memory 300 may be cached is mapped and fixed in advance, and a plurality of addresses in the main memory 300 are mapped and fixed in advance to each address in the cache memory 220. The direct mapped cache is required to search only one address in the cache memory 220 to determine whether a cache hit has occurred.

In the fully associative cache, there is no fixed mapping between the address of the cache memory 220 and the address of the main memory, and any address of the cache memory 220 may cache data stored in any address of the main memory 300. The fully associative cache is required to search all addresses in the cache memory 220 to determine whether a cache hit has occurred.

The set associative cache is an intermediate form between the direct mapped cache and the fully associative cache, and manages the cache memory 220 by dividing the cache memory 220 into a plurality of cache sets. Each cache set may be divided into cache ways, each way of each set being a cache line to be managed. In an n-way set associative cache, n>=2, each address in the main memory 300 may be cached in n locations in the cache memory 220. The n-way set associative cache is required to search n addresses in the cache memory 220 to determine whether a cache hit has occurred.

According to an embodiment of the present disclosure, the cache memory 220 may include dedicated areas respectively corresponding to the meta data stored in the main memory 300. According to an embodiment of the present disclosure, specific meta data may be cached only in a corresponding dedicated area. Therefore, when the meta data stored in the main memory 300 has different access frequencies, that is, in a case of having a non-linear access probability for each address of the meta data, a phenomenon in which only specific meta data is cached may be prevented. As a result, a cache hit rate may increase.

Various embodiments of the cache memory 220 according to the present disclosure will be described later in more detail with reference to FIGS. 6 to 10.

The host 400 may communicate with the storage device 50 using at least one of various communication methods such as a universal serial bus (USB), a serial AT attachment (SATA), a serial attached SCSI (SAS), a high speed interchip (HSIC), a small computer system interface (SCSI), a peripheral component interconnection (PCI), a PCI express (PCIe), a nonvolatile memory express (NVMe), a universal flash storage (UFS), a secure digital (SD) card, a multi-media card (MMC), an embedded MMC (eMMC), a dual in-line memory module (DIMM), a registered DIMM (RDIMM), and a load reduced DIMM (LRDIMM).

Figure 2:
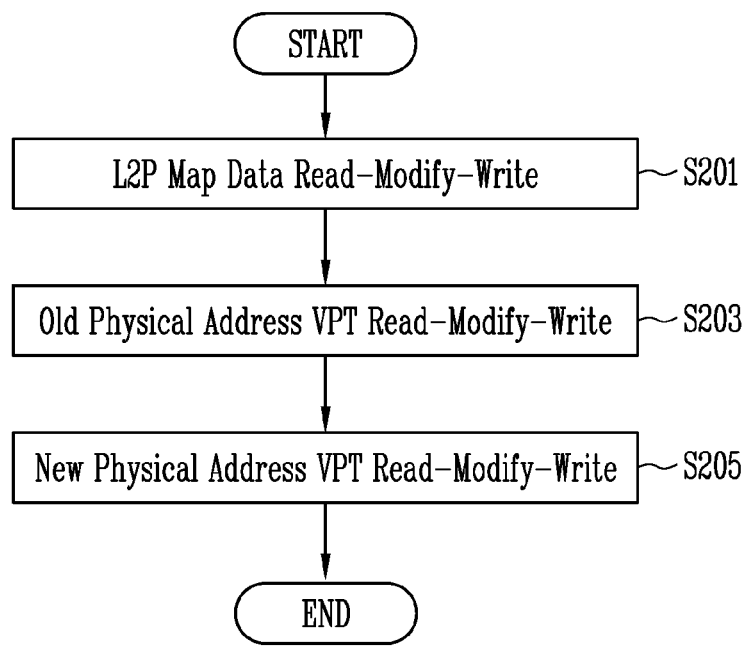
FIG. 2 is a flowchart of a map update operation of the storage device.

FIG. 2 is a flowchart for describing a map update operation of the storage device.

The map data stored in the main memory 300 described with reference to FIG. 1 may be updated. For example, when the write request of the new data is received for a logical address corresponding to a previous write request, the previously stored data may become the invalid data, and the physical address corresponding to the logical address may be changed and the map data updated accordingly. In addition, when the position where the data is stored is changed by various background operations such as garbage collection, read reclaim, and wear leveling, the map data may be updated. The update of the map data is referred to as the map update.

Referring to FIGS. 1 and 2, the main memory 300 may include logical-to-physical map data (L2P map data) indicating the correspondence relationship between the logical address provided by the host 400 and the physical address of the memory cells included in the memory device 100, and may include the valid page table (VPT) indicating whether the data stored in the pages included in the memory device 100 is the valid data. In an embodiment, the VPT may be data of a bitmap form indicating whether data stored in a corresponding page in a 4 KB unit is valid, but embodiments are not limited thereto.

The L2P map data may include a plurality of map segments. Each of the map segments may include a plurality of map entries. The map entry may include information on the correspondence relationship between the logical address and the physical address.

In step S201, the processor 210 may read and modify the map segment including the map entry for the logical address to be updated among the map data stored in the main memory 300, and then may store the map segment in the main memory 300 again (Read-Modify-Write). Modifying the map entry for the logical address may include replacing an old physical address in the map entry with a new physical address. At this time, the VPT is also required to be updated to indicate that the data stored in the old physical address is invalid data and that the data stored in the new physical address is valid data.

In step S203, the processor 210 may read from the main memory 300 the VPT including the validity indication of the old physical address, may modify the VPT to indicate that the data stored in the old physical address is the invalid data, and then may store the modified VPT corresponding to the old physical address in the main memory 300 again (Read-Modify-Write).

In step S205, the processor 210 may read from the main memory 300 the VPT including the validity indication of the new physical address, may modify VPT to indicate that data to be stored in the new physical address is valid data, and then may store the modified VPT corresponding to the new physical address in the main memory 300 again (Read-Modify-Write).

In FIG. 2, steps S201 to S205 are shown as being sequentially performed, but in various embodiments, a sequence in which steps S201 to S205 are performed may be changed. For example, the processor 210 may read the previous L2P map segment, may perform the read-modify-write on the VPT of the old physical address, may perform the read-modify-write on the VPT of the new physical address, and then may store the new physical address in the L2P map segment. Furthermore, references to reading data in the main memory 300 may actually refer to reading data from the cache memory 220 when a cache hit occurs, and references to storing data in the main memory 300 may actually refer to storing data in the cache memory 220 when a cache hit occurs (as well as storing the data in the main memory 300 when the cache memory 220 is a write-through cache), but embodiments are not limited thereto.

Figure 3:
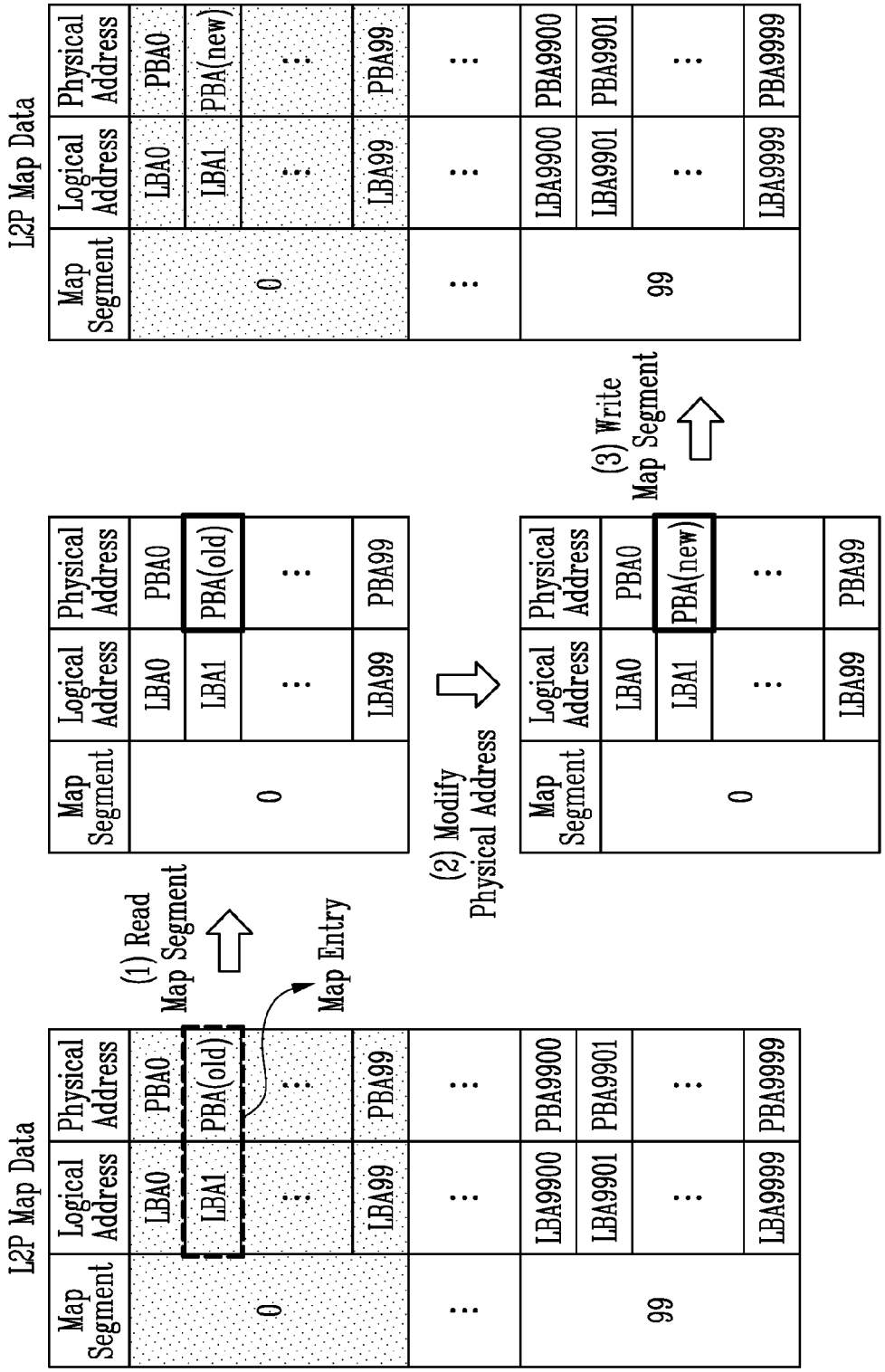
FIG. 3 illustrates a read-modify-write operation on an L2P map data of FIG. 2.

FIG. 3 is a diagram for describing the read-modify-write operation on the L2P map data of FIG. 2.

Referring to FIGS. 1 to 3, an operation of updating the map data of a first logical block address LBA1 will be described.

The L2P map data may include a plurality of map segments. Each of the map segments may include a plurality of map entries. Each map entry may include information on the correspondence relationship between a logical address and a physical address.

The processor 210 may read from among the map data stored in the main memory 300 a map segment 0, which is the map segment including the map entry of the first logical block address LBA1 (among others) (1).

Thereafter, the processor 210 may modify the read map entry of the first logical block address LBA1 by changing the physical address corresponding to the first logical block address LBA1 from a physical block address PBA (old) to a new physical block address PBA (new) (2).

The processor 210 may store the map segment 0, which is the map segment including the map entry of the modified first logical block address LBA1 (3), into the main memory 300.

FIG. 4 is a diagram for describing the read-modify-write of the VPT of the old physical address of FIG. 2.

The VPT may be data of a bitmap form wherein each of the bits indicating whether the data of the pages included in the memory device 100 is valid data. The VPT may include a plurality of bits respectively corresponding to a plurality of pages, wherein a bit having a "set" state may indicate that the data stored in the corresponding page is valid data, and a bit having a "clear" state may indicate that the data stored in the corresponding page is invalid data.

Referring to FIGS. 1, 2 and 4, the VPT including the old physical block addresses is shown in FIG. 4. Since a first bit, a second bit, and seventh to tenth bits are in the "set" state, the data stored in the pages corresponding to the first, second, and seventh to tenth bits are indicated as being valid data. Since third to sixth bits are in the "clear" state, the data stored in the pages corresponding to the third to sixth bits are indicated as being invalid data.

Assuming for purposes of this example that the page corresponding to the old physical block address is the seventh bit. The processor 210 may read the VPT including the old physical block address, and modify the seventh bit from the "set" state to the "clear" state. In an embodiment, a bit value of "1" may indicate the "set" state and a bit value of "0" may indicate the "clear" state. In another embodiment, the bit value of "0" may indicate the "set" state and the bit value of "1" may indicate the "clear" state. The processor 210 may store the modified VPT in which the seventh bit has been changed from the "set" state to the "clear" state in the main memory 300.

FIG. 5 is a diagram for describing the read-modify-write of the VPT of the new physical address of FIG. 2.

Referring to FIGS. 1, 2 and 5, the VPT including the new physical block address is shown in FIG. 5. In general, when the memory controller 200 stores the data in the memory device 100, the memory controller 200 erases a free block so that the free block becomes a memory block which is empty of data, and then sequentially stores data in pages included in the free block.

Therefore, all bits of the VPT including the new physical block address may be in the "clear" state indicating that valid data has not yet been written to the corresponding pages, as shown in the upper part of FIG. 5.

Assuming for this example that the bit corresponding to the page of the new physical block address is a first bit, the processor 210 may read the VPT including the new physical block address and modify the first bit from the "clear" state to the "set" state. In an embodiment, the bit value of "1" may indicate the "set" state and the bit value of "0" may indicate the "clear" state. In another embodiment, the bit value of "0" may indicate the "set" state and the bit value of "1" may indicate the "clear" state. The processor 210 may store the modified VPT in which the first bit is changed from the "clear" state to the "set" state in the main memory 300.

Figure 6:
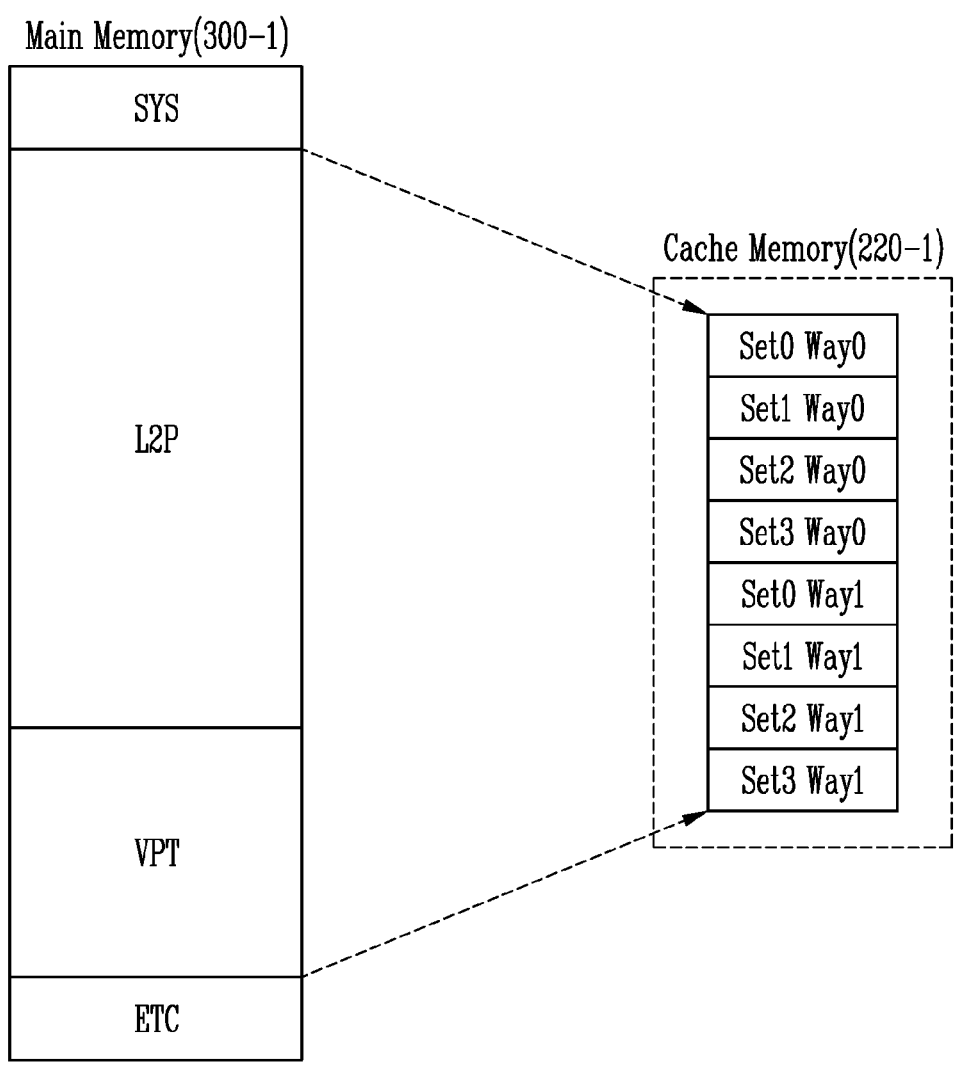
FIG. 6 illustrates a cache memory such as may be used in the storage device FIG. 1.

FIG. 6 is a diagram illustrating cache memory 220-1 that may be used as the cache memory 220 of FIG. 1.

Referring to FIG. 6, a main memory 300-1 may include system data SYS, L2P map data L2P, VPT data VPT, and other meta data ETC. The system data SYS, the L2P map data L2P, the VPT data VPT, and the other meta data ETC may be the meta data described with reference to FIG. 1. For example, the system data SYS may be firmware (FW) data. The other meta data ETC may include the bad block data, the read count data, the cycling data, the hot/cold data, the journal data indicating the change content of the map data, and the like.

Among the various data stored in the main memory 300-1, the L2P map data L2P and the VPT data VPT may be data most frequently accessed by the processor 210. In terms of a size of data, the L2P map data L2P may occupy most of a capacity of the main memory 300-1, and VPT data VPT may occupy a smaller amount of that capacity than the L2P map.

A cache memory 220-1 may store data accessed by the processor 220 from the main memory 300-1. Since a speed of the cache memory 220-1 is faster than that of the main memory 300 and a size of the cache memory 220-1 is smaller than that of the main memory 300, the cache hit rate may increase as data that is frequently accessed or is likely to be accessed is stored in the cache memory 220-1.

In a case of the map update operation described with reference to FIGS. 2 to 5, the L2P map data L2P is accessed once, but the VPT data VPT is accessed twice (old/new VPT are accessed respectively).

The cache memory 200-1 shown in FIG. 6 caches data of the main memory 300-1 in a 2 way/4 set associative manner. Therefore, the VPT data VPT that is accessed more frequently data is cached more frequently, and a relatively less-frequently accessed L2P map data L2P is cached less frequently than the VPT data VPT. As a result, most of the data stored in the cache memory 220-1 may be the VPT data VPT.

As described above, in a case of a non-linear data structure that is not accessed in proportion to the size of data, as shown in FIG. 6, when all addresses of the main memory 300-1 are managed by one cache memory 220-1, a high cache hit rate is unlikely to occur. Accordingly, FIGS. 7-10 illustrate embodiments of cache memories that may have a higher cache hit rate than the cache memory 220-1 of FIG. 6 in the case of the non-linear data structure that is not accessed in proportion to the size of data.

Figure 7:
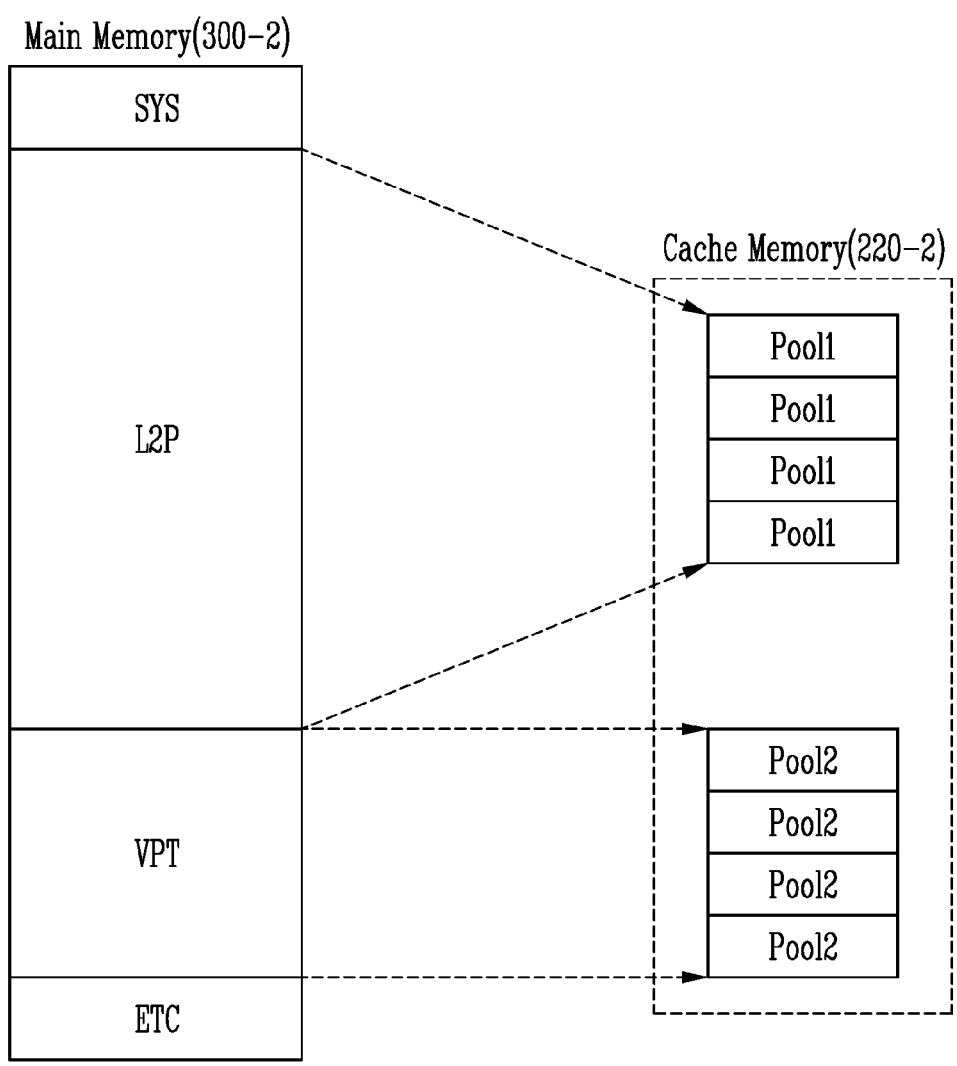
FIG. 7 illustrates the cache memory of FIG. 1 according to a first embodiment.

FIG. 7 is a diagram illustrating a cache memory 220-2 that may be included in the cache memory 220 of FIG. 1 according to an embodiment.

Referring to FIG. 7, a main memory 300-2 may include the system data SYS, the L2P map data L2P, the VPT data VPT, and the other meta data ETC. The system data SYS, the L2P map data L2P, the VPT data VPT, and the other meta data ETC may be the meta data described with reference to FIG. 1. For example, the system data SYS may be the firmware (FW) data. The other meta data ETC may include the bad block data, the read count data, the cycling data, the hot/cold data, the journal data indicating the change content of the map data, and the like.

The cache memory 220-2 may include a plurality of dedicated areas. Specifically, the cache memory 220-2 may include a first pool cache area Pool1 and a second pool cache area Pool2. Each pool cache area may be allocated as an area for caching the L2P map data L2P or as an area for caching the VPT data VPT. For example, the L2P map data L2P may be cached only in the first pool cache area Pool1, and the VPT data VPT may be cached only in the second pool cache area Pool2. That is, the first pool cache area Pool1 and the second pool cache area Pool2 may be defined as dedicated areas for caching the L2P map data L2P and the VPT data VPT, respectively.

In an embodiment, another pool cache area (not shown) may be provided in the cache memory 220-2 for caching the system data SYS and/or the other meta data ETC. In another embodiment, the system data SYS and/or the other meta data ETC may be cached in the first pool cache area Pool1 along with the L2P map data L2P, may be cached in the second pool cache area Pool2 along with the L2P map data L2P, or both. In another embodiment, the system data SYS and/or the other meta data ETC may not be cached in the cache memory 220-2.

In an embodiment, a dedicated area of the cache memory 220-2 may operate in the fully associative manner with respect to a corresponding main memory area.

In an embodiment, one or more address comparison values (such as an address lower bound value, and address upper bound value, or both) associated with a dedicated area of the cache memory 220-2 may be compared to an address of an access to the main memory 300-2 to determine whether the access is to the corresponding main memory area for the dedicated area. In an embodiment, the one or more comparison values may be stored in programmable registers. In an embodiment, each dedicated area in the cache memory 220-2 may have respective one or more comparison values. In another embodiment, the main memory 300-2 may be conceptually organized as a plurality of same-size regions, and a hardware register having one or more bits respectively associated with each region may indicate which if any of the dedicated area of the cache memory 220-2 may cache in that region. For example, given a main memory 300-2 having a capacity of 1024 megabytes and a cache memory 220-2 including first and second dedicated areas, the main memory 300-2 may be conceptually organized as 256 16-megabyte regions, and a region map may include two bits for each region, where the two bits for each region may indicate that the region may be one of non-cacheable, cacheable in only the first dedicated area, cacheable in only the second dedicated area, and cacheable in any area. In embodiments, the region map may be stored in a programmable register, and the bits for a region identified using some number of most significant bits of the address used to access the main memory 300-2. However, embodiments are not limited to the two illustrative embodiments described above.

In an embodiment, management of the dedicated areas of the cache memory 220-2 may be performed as part of a cache miss handling process of the cache memory 220-2. When a cache miss occurs on an access to the main memory 300-2, the dedicated area of the cache memory 220-2 corresponding to the address of the access may be identified (such as by using address comparison values or a region map, as described above), and a cache line from among cache lines associated with the identified dedicated area may be allocated to store the data of the access according to a replacement policy of the cache memory 220-2. However, embodiments are not limited thereto.

According to the embodiment of FIG. 7, a phenomenon in which frequent access to a specific address area causes the cache miss in another address area may be fundamentally prevented. That is, by separating the cache area storing accesses to the L2P map data L2P and the cache area storing accesses to the VPT data VPT, an effect of each access on the cache hit rate may be eliminated, and a maximum cache hit rate in the each of the dedicated areas may be expected.

In an embodiment, a size of the first pool cache area Pool1 and the second pool cache area Pool2 may be the same.

Alternatively, the sizes of the first pool cache area Pool1 and the second pool cache area Pool2 may be different. When the sizes of the first pool cache area Pool1 and the second pool cache area Pool2 are different, the sizes of the first pool cache area Pool1 and the second pool cache area Pool2 may be proportional or inversely proportional to the number of accesses of data in the main memory 300-2 corresponding to each of the first pool cache area Pool1 and the second pool cache area Pool2. Alternatively, the sizes of the first pool cache area Pool1 and the second pool cache area Pool2 may be proportional or inversely proportional to a size of the data in the main memory 300-2 corresponding to each of the first pool cache area Pool1 and the second pool cache area Pool2.

Figure 8:
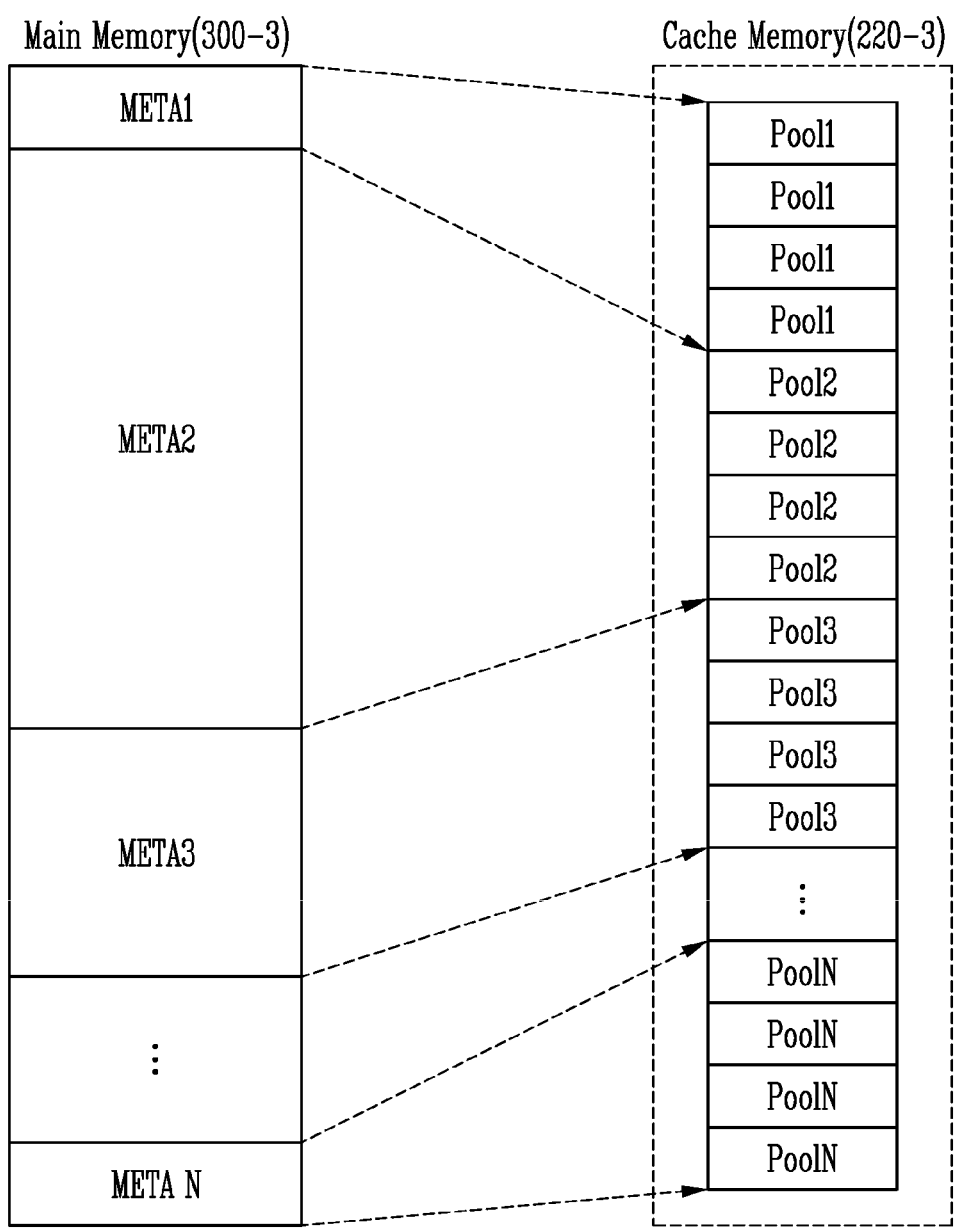
FIG. 8 illustrates the cache memory of FIG. 1 according to a second embodiment.

FIG. 8 is a diagram illustrating a cache memory 220-3 that may be included in the cache memory 220 of FIG. 1 according to another embodiment.

Referring to FIG. 8, a main memory 300-3 may store a plurality of meta data. Specifically, the main memory 300-3 may store first meta data META1 to N-th meta data META N.

Here, each of the meta data META1 to META N may respectively be one or more of the bad block data, the firmware data, the map data, the VPT data, the read count data, the cycling data, the hot/cold data, and the map journal data described with reference to FIG. 1.

Each meta data has a different size of data, and the number of times each meta data is accessed for each operation may be different. Therefore, when each meta data is cached in one cache memory, only cache miss may occur with respect to specific meta data.

The cache memory 220-3 may include a plurality of dedicated areas. Specifically, the cache memory 220-3 may include a first pool cache area Pool1 to an N-th pool cache area Pool N. The first pool cache area Pool1 to the N-th pool cache area Pool N may be dedicated areas respectively corresponding to the first meta data META1 to the N-th meta data META N. That is, the first pool cache area Pool1 to the N-th pool cache area Pool N may operate as dedicated cache memories corresponding to addresses in which the first meta data META1 to the N-th meta data META N are stored, respectively. In embodiments, the cache memory 220-3 may determine the dedicated area corresponding to an access to the main memory 300-3 using techniques similar to the address comparison values or region map described with respect to the cache memory 220-2 of FIG. 7, and may manage the dedicated areas as part of cache miss handling as described with respect to the cache memory 220-2 of FIG. 7, but embodiments are not limited thereto.

In an embodiment, a size of each of the first pool cache area Pool1 to the N-th pool cache area Pool N may be the same. That is, the size of the first pool cache area Pool1 to the N-th pool cache area Pool N may be equally allocated regardless of sizes of the first meta data META1 to the N-th meta data META N stored in the main memory 300-3.

Figure 9:
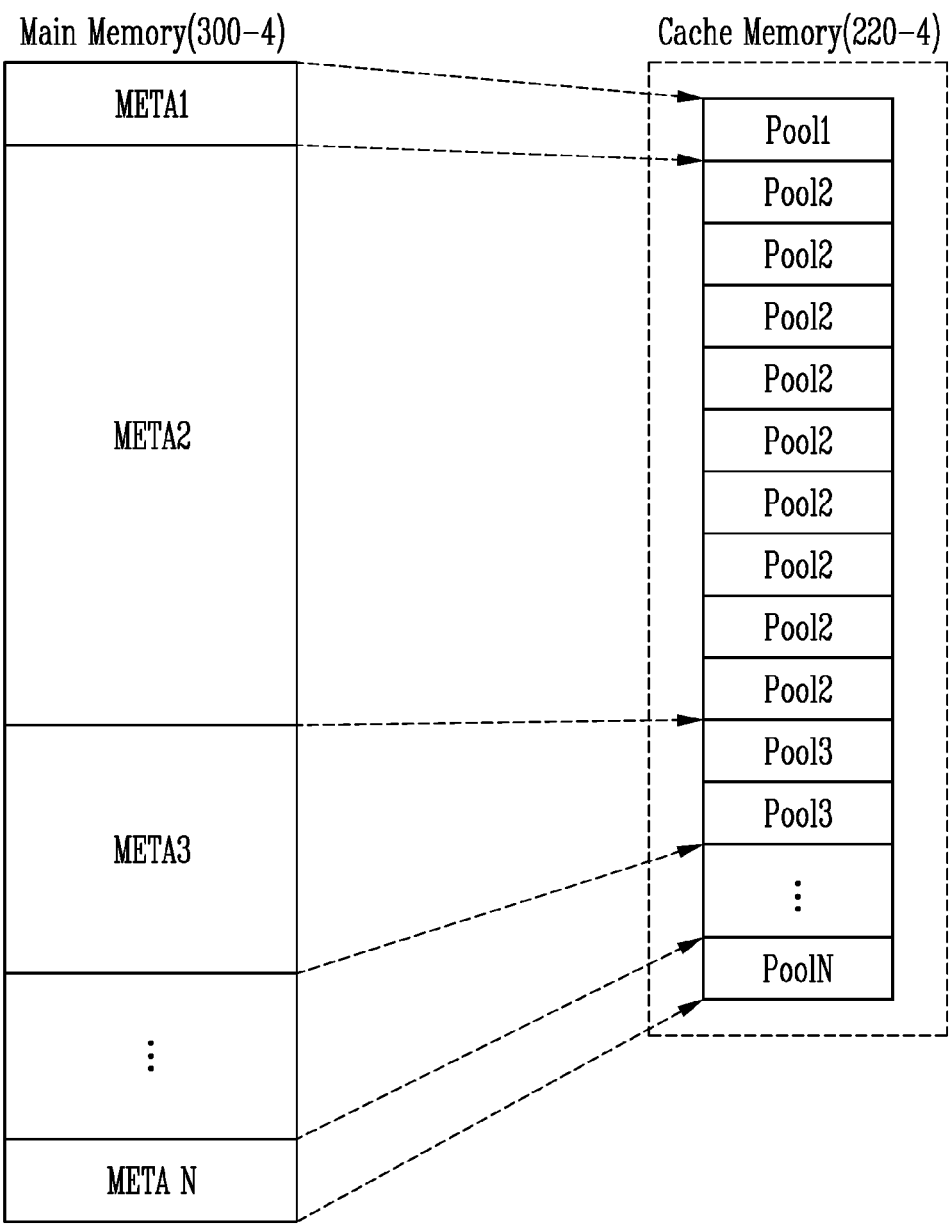
FIG. 9 illustrates the cache memory of FIG. 1 according to a third embodiment.

FIG. 9 is a diagram illustrating a cache memory 220-4 that may be included in the cache memory 220 of FIG. 1 according to an embodiment.

Referring to FIG. 9, a main memory 300-4 is the same as the main memory 300-3 described with reference to FIG. 8, and thus detailed description is omitted here.

Differently from the cache memory 220-3 of FIG. 8, a cache memory 220-4 according to the embodiment of FIG. 9 may include a first pool cache area Pool1 to an N-th pool cache area Pool N of different sizes.

In an embodiment, the sizes of the first pool cache area Pool1 to the N-th pool cache area Pool N of the cache memory 220-4 may be allocated to be proportional to sizes of the regions of the main memory 300-4 respectively corresponding to the first pool cache area Pool1 to the N-th pool cache area Pool N.

Figure 10:
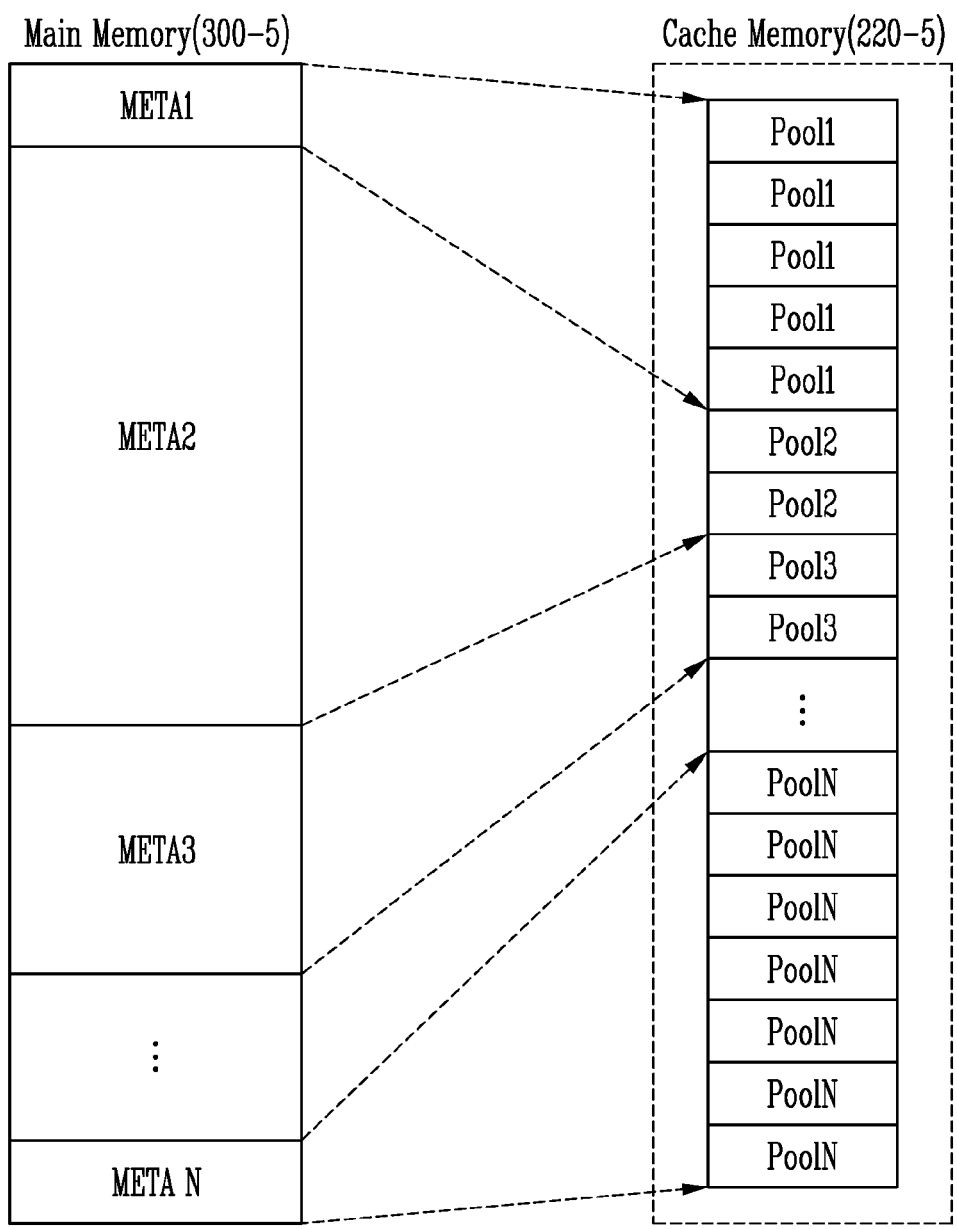
FIG. 10 illustrates the cache memory of FIG. 1 according to a fourth embodiment.

FIG. 10 is a diagram illustrating a cache memory 220-5 that may be included in the cache memory 220 of FIG. 1 according to an embodiment.

Referring to FIG. 10, a main memory 300-5 is the same as the main memory 300-3 described with reference to FIG. 8, and thus detailed description is omitted here.

Differently from the cache memory 220-3 of FIG. 8, a cache memory 220-5 according to the embodiment of FIG. 9 may include a first pool cache area Pool1 to an N-th pool cache area Pool N of different sizes.

In an embodiment, the sizes of the first pool cache area Pool1 to the N-th pool cache area Pool N of the cache memory 220-5 may be allocated to be inversely proportional to sizes of the regions of the main memory 300-5 respectively corresponding to the first pool cache area Pool1 to the N-th pool cache area Pool N.

The processor 210 of the memory controller 200 described with reference to FIG. 1 may configure the cache memory 220 as one of the cache memories 220-3 to 220-5 of FIGS. 8 to 10. That is, the processor 210 may configure the cache memory 220 to include dedicated areas of a number of data having different data structure stored in the main memory 300-3, and control each of the dedicated area to operate as a dedicated cache area of the respectively corresponding data. In an embodiment, a size of the dedicated areas may be proportional to or inversely proportional to an access frequency of the corresponding data in the main memory 300. Alternatively, the size of the dedicated areas may be proportional to or inversely proportional to the size of the corresponding data in the main memory 300.

Figure 11:
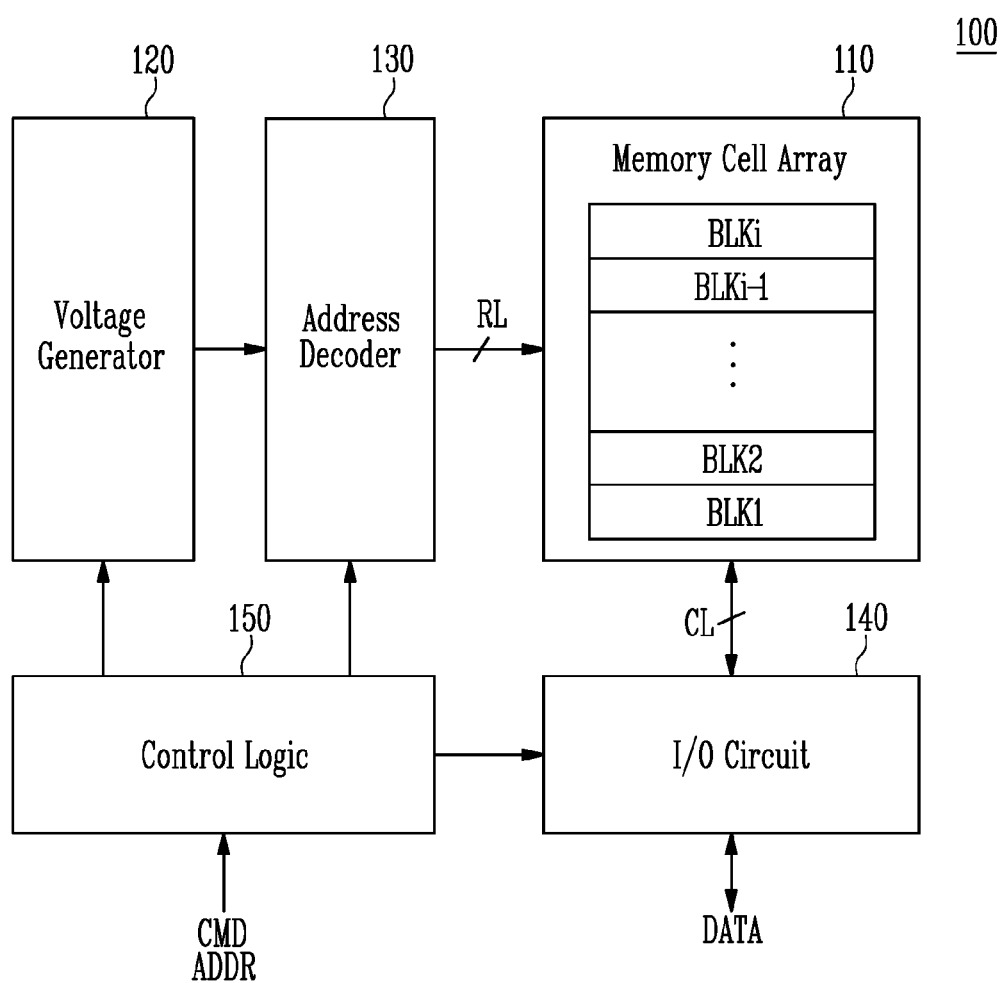
FIG. 11 illustrates a memory device of FIG. 1.

FIG. 11 is a diagram for describing the memory device 100 of FIG. 1.

The memory device 100 may include a memory cell array 110, a voltage generator 120, an address decoder 130, an input/output circuit 140, and a control logic 150.

The memory cell array 110 includes a plurality of memory blocks BLK1 to BLKi. The plurality of memory blocks BLK1 to BLKi are connected to the address decoder 130 through row lines RL. The plurality of memory blocks BLK1 to BLKi may be connected to the input/output circuit 140 through column lines CL. In an embodiment, the row lines RL may include word lines, source select lines, and drain select lines. In an embodiment, the column lines CL may include bit lines.

Each of the plurality of memory blocks BLK1 to BLKi includes a plurality of memory cells. In an embodiment, the plurality of memory cells may be non-volatile memory cells. Memory cells connected to the same word line among the plurality of memory cells may be defined as one physical page. That is, the memory cell array 110 may include a plurality of physical pages. Each of the memory cells of the memory device 100 may be configured as a single level cell (SLC) that stores one data bit, a multi-level cell (MLC) that stores two data bits, a triple level cell (TLC) that stores three data bits, or a quad level cell (QLC) capable of storing four data bits.

In an embodiment, the voltage generator 120, the address decoder 130, and the input/output circuit 140 may be collectively referred to as a peripheral circuit. The peripheral circuit may drive the memory cell array 110 under control of the control logic 150. The peripheral circuit may drive the memory cell array 110 to perform the program operation, the read operation, and the erase operation.

The voltage generator 120 is configured to generate a plurality of operation voltages Vop using an external power voltage supplied to the memory device 100. The voltage generator 120 operates in response to the control of the control logic 150.

As an embodiment, the voltage generator 120 may generate an internal power voltage by regulating the external power voltage. The internal power voltage generated by the voltage generator 120 is used as an operation voltage of the memory device 100.

As an embodiment, the voltage generator 120 may generate the plurality of operation voltages using an external power voltage or an internal power voltage. The voltage generator 120 may be configured to generate various voltages required in the memory device 100. For example, the voltage generator 120 may generate a plurality of erase voltages, a plurality of program voltages, a plurality of pass voltages, a plurality of selected read voltages, and a plurality of unselected read voltages.

The voltage generator 120 may include a plurality of pumping capacitors that receive the internal power voltage to generate the plurality of operation voltages having various voltage levels, and may generate the plurality of operation voltages by selectively activating the plurality of pumping capacitors in response to the control of the control logic 150. The generated plurality of operation voltages may be supplied to the memory cell array 110 by the address decoder 130.

The address decoder 130 is connected to the memory cell array 110 through the row lines RL. The address decoder 130 is configured to operate in response to the control of the control logic 150. The address decoder 130 may receive an address ADDR from the control logic 150. The address decoder 130 may decode a block address among the received addresses ADDR. The address decoder 130 selects at least one memory block among the memory blocks BLK1 to BLKi according to the decoded block address. The address decoder 130 may decode a row address among the received addresses ADDR. The address decoder 130 may select at least one word line among word lines of a selected memory block according to the decoded row address. In an embodiment, the address decoder 130 may decode a column address among the received addresses ADDR. The address decoder 130 may connect the input/output circuit 140 and the memory cell array 110 to each other according to the decoded column address.

According to an embodiment of the present disclosure, during the read operation, the address decoder 130 may apply the read voltage to a selected word line, and apply a read pass voltage of a level higher than that of the read voltage to unselected word lines.

For example, the address decoder 130 may include components such as a row decoder, a column decoder, and an address buffer.

The input/output circuit 140 may include a plurality of page buffers. The plurality of page buffers may be connected to the memory cell array 110 through the bit lines. During the program operation, data may be stored in selected memory cells according to data stored in the plurality of page buffers.

During the read operation, the data stored in the selected memory cells may be sensed through the bit lines, and the sensed data may be stored in the page buffers.

The control logic 150 may control the address decoder 130, the voltage generator 120, and the input/output circuit 140. The control logic 150 may operate in response to the command CMD transmitted from an external device. The control logic 150 may generate various signals in response to the command CMD and the address ADDR to control the peripheral circuits.

Figure 12:
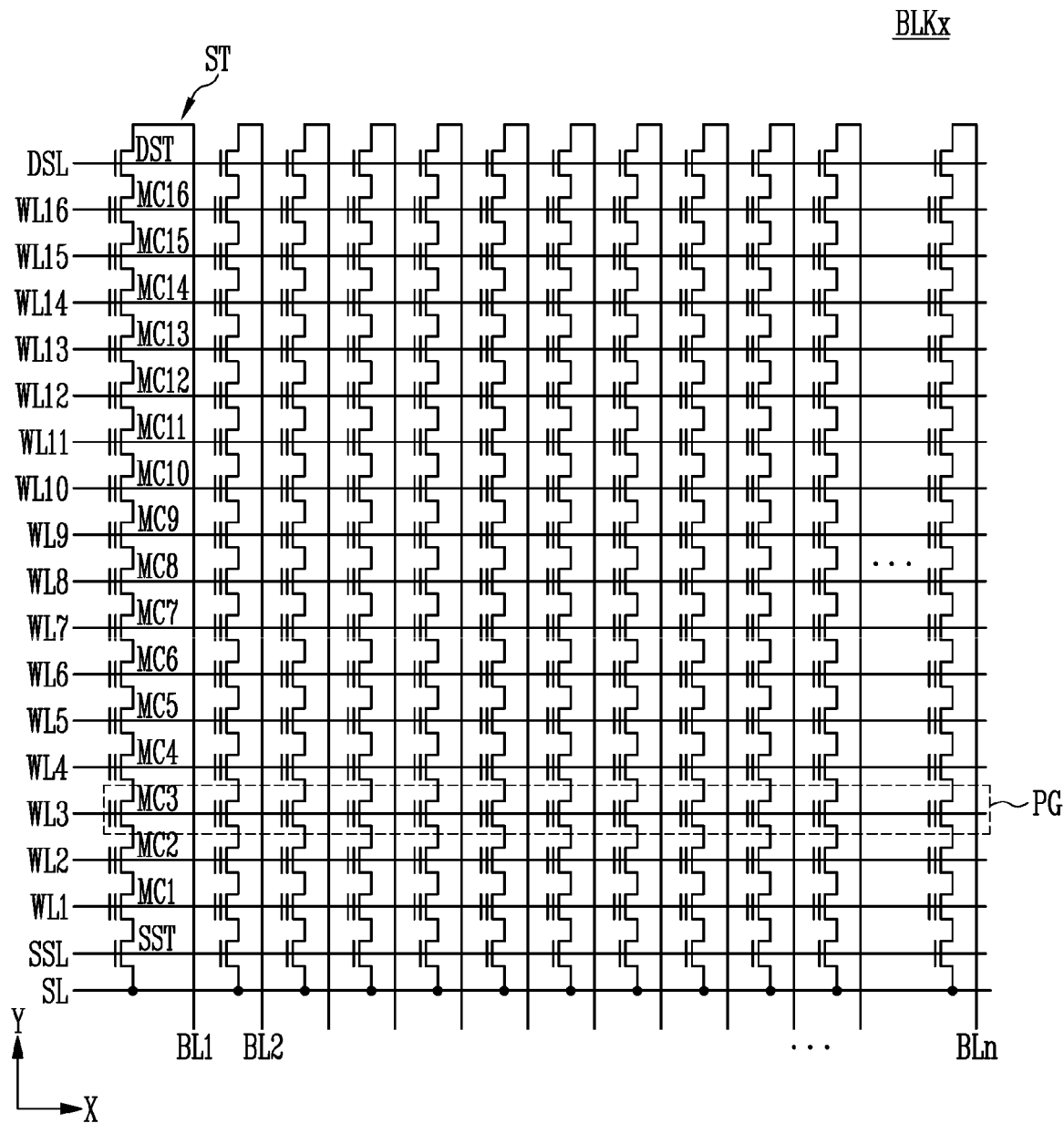
FIG. 12 illustrates a configuration of any one of memory blocks of FIG. 11.

FIG. 12 is a diagram for describing a configuration of a memory block BLKx of FIG. 11.

The memory block BLKx is any one of the memory blocks BLK1 to BLKi of FIG. 11.

Referring to FIG. 11, a plurality of word lines WL1 to WL16 arranged in parallel with each other may be connected between a first select line and a second select line. Here, the first select line may be the source select line SSL, and the second select line may be the drain select line DSL. More specifically, the memory block 110 may include a plurality of strings ST connected between the bit lines BL1 to BLn and the source line SL. The bit lines BL1 to BLn may be connected to the strings ST, respectively, and the source line SL may be commonly connected to the strings ST. Since the strings ST may be configured to be identical to each other, a string ST connected to the first bit line BL1 will be specifically described, as an example.

The string ST may include a source select transistor SST, a plurality of memory cells MC1 to MC16, and a drain select transistor DST connected in series between the source line SL and the first bit line BL1. One string ST may include at least one or more of the source select transistor SST and the drain select transistor DST, and may include more memory cells than the number of the memory cells MC1 to MC16 shown in the figure.

A source of the source select transistor SST may be connected to the source line SL and a drain of the drain select transistor DST may be connected to the first bit line BL1. The memory cells MC1 to MC16 may be connected in series between the source select transistor SST and the drain select transistor DST. Gates of the source select transistors SST included in the different strings ST may be connected to the source select line SSL, gates of the drain select transistors DST may be connected to the drain select line DSL, and gates of the memory cells MC1 to MC16 may be connected to the plurality of word lines WL1 to WL16. A group of the memory cells connected to the same word line among the memory cells included in different strings ST may be referred to as a page PG. Therefore, the memory block BLKi may include a number of pages PG equal to the number of the word lines WL1 to WL16.

One memory cell may store one bit of data. This is commonly called a single level cell (SLC). In this case, one physical page PG may store one logical page (LPG) data. The one logical page (LPG) data may include data bits of the same number as cells included in one physical page PG.

The one memory cell may store two or more bits of data. In this case, one physical page PG may store two or more logical page (LPG) data.

Figure 13:
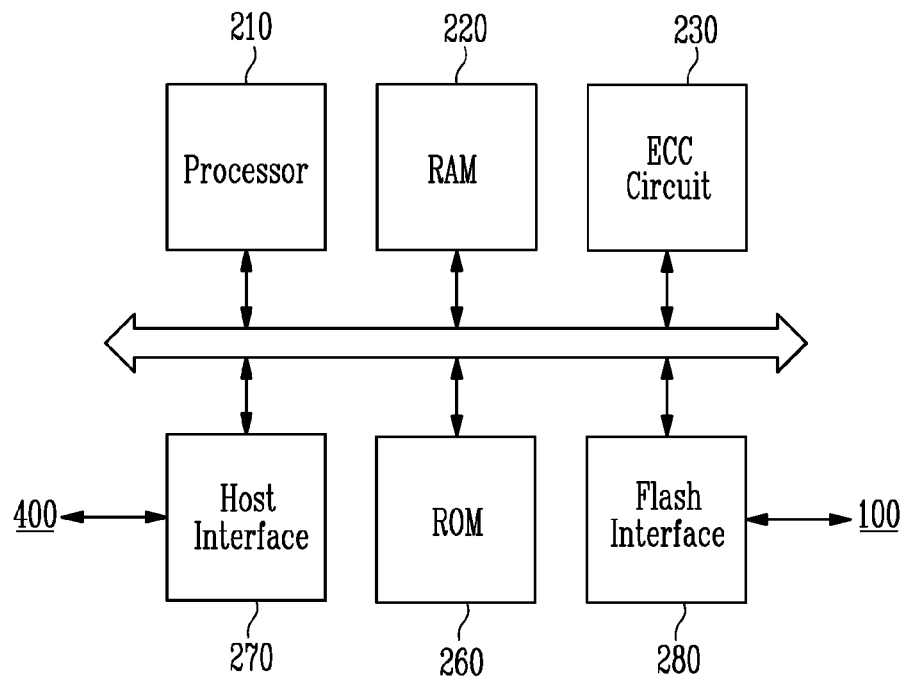
FIG. 13 illustrates an embodiment of the memory controller of FIG. 1.

FIG. 13 is a diagram illustrating an embodiment of the memory controller of FIG. 1.

Referring to FIGS. 1 and 13, the memory controller 200 may include a processor 210, a RAM 220, an error correction circuit 230, a ROM 260, a host interface 270, and a flash interface 280.

The processor 210 may control overall operations of the memory controller 200. The RAM 220 may be used as a buffer memory, a cache memory, and an operation memory of the memory controller 200. For example, the cache memory 220 described with reference to FIG. 1 may be the RAM 220, and in an embodiment, may be an SRAM.

The ROM 260 may store various information required for the memory controller 200 to operate in a firmware form.

The memory controller 200 may communicate with an external device (for example, the host 400, an application processor, and the like) through the host interface 270.

The memory controller 200 may communicate with the memory device 100 through the flash interface 280. The memory controller 200 may transmit a command CMD, an address ADDR, and a control signal CTRL to the memory device 100 through the flash interface 280 and receive data DATA. For example, the flash interface 280 may include a NAND interface.

Figure 14:
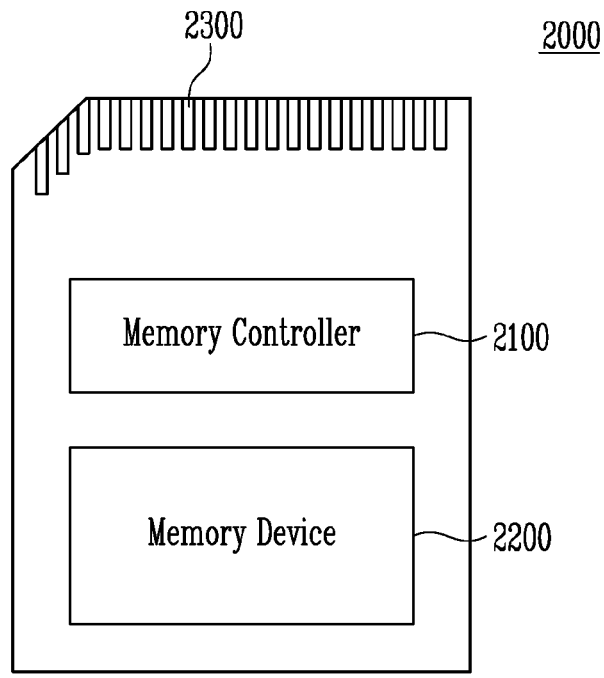
FIG. 14 illustrates a memory card system to which the storage device according to an embodiment of the present disclosure is applied.

FIG. 14 is a block diagram illustrating a memory card system to which the storage device according to an embodiment of the present disclosure is applied.

Referring to FIG. 14, the memory card system 2000 includes a memory controller 2100, a memory device 2200, and a connector 2300.

The memory controller 2100 is connected to the memory device 2200. The memory controller 2100 is configured to access the memory device 2200. For example, the memory controller 2100 may be configured to control read, write, erase, and background operations of the memory device 2200. The memory controller 2100 is configured to provide an interface between the memory device 2200 and a host. The memory controller 2100 is configured to drive firmware for controlling the memory device 2200. The memory controller 2100 may be implemented equally to the memory controller 200 described with reference to FIG. 1.

For example, the memory controller 2100 may include components such as a random access memory (RAM), a processor, a host interface, a memory interface, and an error corrector.

The memory controller 2100 may communicate with an external device through the connector 2300. The memory controller 2100 may communicate with an external device (for example, the host) according to a specific communication standard. For example, the memory controller 2100 is configured to communicate with an external device through at least one of various communication standards such as a universal serial bus (USB), a multimedia card (MMC), an embedded MMC (MCM), a peripheral component interconnection (PCI), a PCI express (PCI-E), an advanced technology attachment (ATA), a serial-ATA, a parallel-ATA, a small computer system interface (SCSI), an enhanced small disk interface (ESDI), integrated drive electronics (IDE), FireWire, a universal flash storage (UFS), Wi-Fi, Bluetooth, and an NVMe. For example, the connector 2300 may be defined by at least one of the various communication standards described above.

For example, the memory device 2200 may be configured of various non-volatile memory devices such as an electrically erasable and programmable ROM (EEPROM), a NAND flash memory, a NOR flash memory, a phase-change RAM (PRAM), a resistive RAM (ReRAM), a ferroelectric RAM (FRAM), and a spin transfer torque magnetic RAM (STT-MRAM).

The memory controller 2100 and the memory device 2200 may be integrated into one semiconductor device to configure a memory card. For example, the memory controller 2100 and the memory device 2200 may be integrated into one semiconductor device to configure a memory card such as a PC card (personal computer memory card international association (PCMCIA)), a compact flash (CF) card, a smart media card (SM or SMC), a memory stick, a multimedia card (MMC, RS-MMC, MMCmicro, or eMMC), an SD card (SD, miniSD, microSD, or SDHC), and a universal flash storage (UFS).

Figure 15:
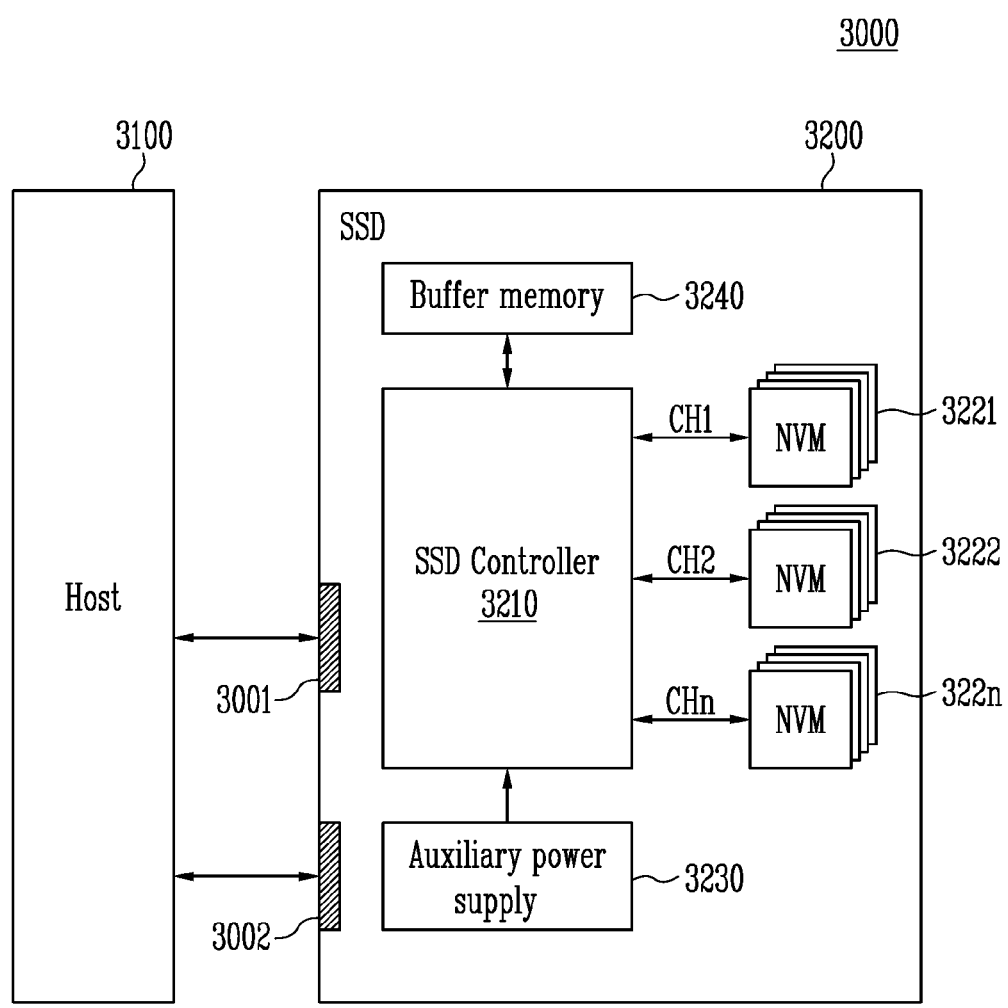
FIG. 15 illustrates a solid state drive (SSD) system to which the storage device according to an embodiment of the present disclosure is applied.

FIG. 15 is a block diagram illustrating a solid state drive (SSD) system to which the storage device according to an embodiment of the present disclosure is applied.

Referring to FIG. 15, the SSD system 3000 includes a host 3100 and an SSD 3200. The SSD 3200 exchanges a signal SIG with the host 3100 through a signal connector 3001 and receives power PWR through a power connector 3002. The SSD 3200 includes an SSD controller 3210, a plurality of flash memories 3221 to 322n, an auxiliary power device 3230, and a buffer memory 3240.

According to an embodiment of the present disclosure, the SSD controller 3210 may perform the function of the memory controller 200 described with reference to FIG. 1.

The SSD controller 3210 may control the plurality of flash memories 3221 to 322n in response to the signal SIG received from the host 3100. For example, the signal SIG may be signals based on an interface between the host 3100 and the SSD 3200. For example, the signal SIG may be a signal defined by at least one of interfaces such as a universal serial bus (USB), a multimedia card (MMC), an embedded MMC (MCM), a peripheral component interconnection (PCI), a PCI express (PCI-E), an advanced technology attachment (ATA), a serial-ATA, a parallel-ATA, a small computer system interface (SCSI), an enhanced small disk interface (ESDI), integrated drive electronics (IDE), Fire-Wire, a universal flash storage (UFS), Wi-Fi, Bluetooth, and an NVMe.

The auxiliary power device 3230 is connected to the host 3100 through the power connector 3002. The auxiliary power device 3230 may receive the power PWR from the host 3100 and may charge the power. The auxiliary power device 3230 may provide power of the SSD 3200 when power supply from the host 3100 is not smooth. For example, the auxiliary power device 3230 may be positioned in the SSD 3200 or may be positioned outside the SSD 3200. For example, the auxiliary power device 3230 may be positioned on a main board and may provide auxiliary power to the SSD 3200.

The buffer memory 3240 operates as a buffer memory of the SSD 3200. For example, the buffer memory 3240 may temporarily store data received from the host 3100 or data received from the plurality of flash memories 3221 to 322n, or may temporarily store meta data (for example, a mapping table) of the flash memories 3221 to 322n. The buffer memory 3240 may include a volatile memory such as a DRAM, an SDRAM, a DDR SDRAM, an LPDDR SDRAM, and a GRAM, or a non-volatile memory such as an FRAM, a ReRAM, an STT-MRAM, and a PRAM.

Figure 16:
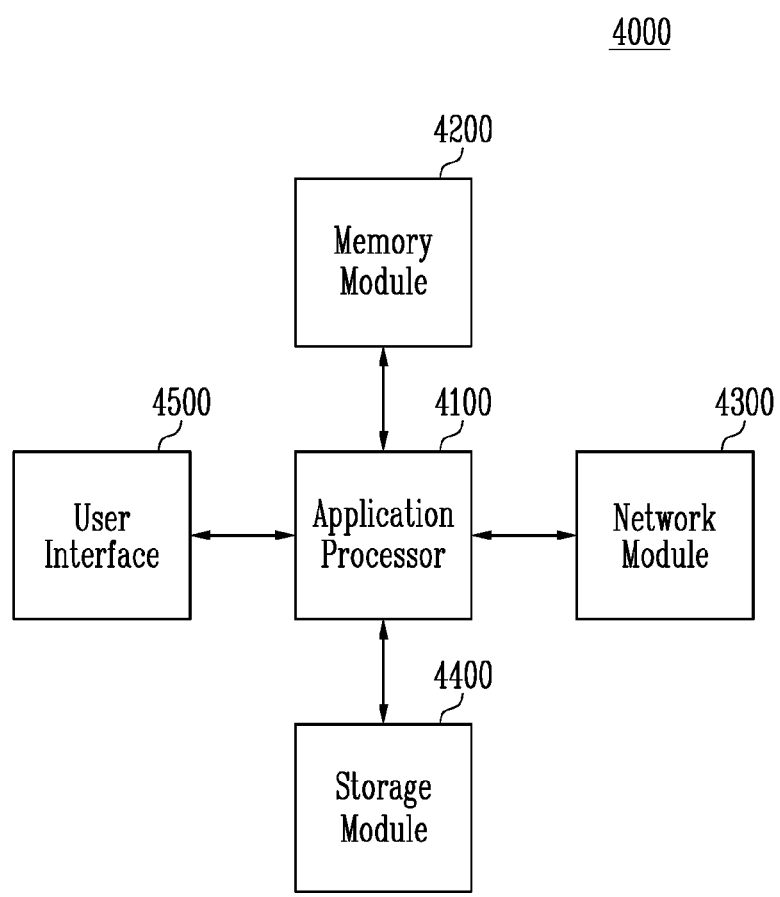
FIG. 16 illustrates a user system to which the storage device according to an embodiment of the present disclosure is applied.

FIG. 16 is a block diagram illustrating a user system to which the storage device according to an embodiment of the present disclosure is applied.

Referring to FIG. 16, the user system 4000 includes an application processor 4100, a memory module 4200, a network module 4300, a storage module 4400, and a user interface 4500.

The application processor 4100 may drive components, an operating system (OS), a user program, or the like included in the user system 4000. For example, the application processor 4100 may include controllers, interfaces, graphics engines, and the like that control the components included in the user system 4000. The application processor 4100 may be provided as a system-on-chip (SoC).

The memory module 4200 may operate as a main memory, an operation memory, a buffer memory, or a cache memory of the user system 4000. The memory module 4200 may include a volatile random access memory such as a DRAM, an SDRAM, a DDR SDRAM, a DDR2 SDRAM, a DDR3 SDRAM, an LPDDR SDARM, an LPDDR2 SDRAM, and an LPDDR3 SDRAM, or a non-volatile random access memory, such as a PRAM, a ReRAM, an MRAM, and an FRAM. For example, the application processor 4100 and memory module 4200 may be packaged based on a package on package (POP) and provided as one semiconductor package.

The network module 4300 may communicate with external devices. For example, the network module 4300 may support wireless communication such as code division multiple access (CDMA), global system for mobile communications (GSM), wideband CDMA (WCDMA), CDMA-2000, time division multiple access (TDMA), long term evolution, Wimax, WLAN, UWB, Bluetooth, and Wi-Fi. For example, the network module 4300 may be included in the application processor 4100.

The storage module 4400 may store data. For example, the storage module 4400 may store data received from the application processor 4100. Alternatively, the storage module 4400 may transmit data stored in the storage module 4400 to the application processor 4100. For example, the storage module 4400 may be implemented as a non-volatile semiconductor memory element such as a phase-change RAM (PRAM), a magnetic RAM (MRAM), a resistive RAM (RRAM), a NAND flash, a NOR flash, and a three-dimensional NAND flash. For example, the storage module 4400 may be provided as a removable storage device (removable drive), such as a memory card, and an external drive of the user system 4000.

For example, the storage module 4400 may include a plurality of non-volatile memory devices, and the plurality of non-volatile memory devices may operate identically to the memory device 100 described with reference to FIG. 1. The storage module 4400 may operate identically to the storage device 50 described with reference to FIG. 1.

The user interface 4500 may include interfaces for inputting data or an instruction to the application processor 4100 or for outputting data to an external device. For example, the user interface 4500 may include user input interfaces such as a keyboard, a keypad, a button, a touch panel, a touch screen, a touch pad, a touch ball, a camera, a microphone, a gyroscope sensor, a vibration sensor, and a piezoelectric element. The user interface 4500 may include user output interfaces such as a liquid crystal display (LCD), an organic light emitting diode (OLED) display device, an active matrix OLED (AMOLED) display device, an LED, a speaker, and a monitor.

What is claimed is:

1. A memory controller for controlling a non-volatile memory, the memory controller comprising:
    a volatile main memory configured to store map data and a valid page table read from the non-volatile memory, the map data including correspondence relationships between logical addresses provided by a host and physical addresses of the non-volatile memory, and the valid page table including validity indications for data stored at the physical addresses;
    a cache memory including first and second dedicated areas for respectively caching the map data and the valid page table, wherein each size of the first and second dedicated areas is allocated differently by a processor; and
    the processor configured to request from the volatile main memory map data corresponding to a logical address and a validity indication from the valid page table of a physical address corresponding to the logical address,
    wherein, in response to the processor requesting the map data corresponding to the logical address, the map data corresponding to the logical address is cached in the first dedicated area, and
    wherein, in response to the processor requesting the validity indication from the valid page table, the validity indication from the valid page table is cached in the second dedicated area.

2. The memory controller of claim 1, wherein the first and second dedicated areas have storage capacity sizes proportional to data sizes of the map data and the valid page table, respectively.

3. The memory controller of claim 1, wherein the first and second dedicated areas have storage capacity sizes inversely proportional to data sizes of the map data and the valid page table, respectively.

4. The memory controller of claim 1, wherein the first and second dedicated areas have storage capacity sizes proportional to a number of times the processor accesses the map data and the valid page table, respectively.

5. The memory controller of claim 1, wherein the first and second dedicated areas have storage capacity sizes inversely proportional to a number of times the processor accesses the map data and the valid page table, respectively.

6. A memory controller comprising:
a volatile main memory configured to store first meta data and second meta data read from a non-volatile memory, wherein the first meta data is in a different type of data structure from the second meta data;
a cache memory including a first dedicated area and a second dedicated area for respectively caching the first meta data and the second meta data, wherein each size of the first and second dedicated areas is allocated differently by a processor; and
the processor configured to control the cache memory to store, when data stored in the volatile main memory is accessed in response to a request from a host among the first meta data and the second meta data, data in a dedicated area corresponding to the data among the first dedicated area and the second dedicated area.

7. The memory controller of claim 6, wherein the first dedicated area is dedicated to caching data at addresses of the volatile main memory in which the first meta data is stored, and
the second dedicated area is dedicated to caching data at addresses of the volatile main memory in which the second meta data is stored.

8. The memory controller of claim 6, wherein the first meta data includes data chunks having a first data structure, and
the second meta data includes data chunks having a second data structure.

9. The memory controller of claim 6, wherein the first meta data corresponds to a data storage capacity larger than a data storage capacity corresponding to the second meta data.

10. The memory controller of claim 6, wherein sizes of the first meta data and the second meta data are in a non-linear relationship with a number of times the first meta data and the second meta data are accessed.

11. A storage device comprising:
a volatile main memory configured to store first to N-th meta data read from a non-volatile memory, N being greater than or equal to two, wherein each of the first to N-th meta data is in a different type of data structure;
a cache memory including first to N-th dedicated areas for respectively caching the first to N-th meta data corresponding to areas of the volatile main memory in which the first to N-th meta data are stored; and
a processor configured to cache, when data stored in the volatile main memory is accessed according to requests provided from a host among the first to N-th meta data, data in a dedicated area corresponding to the data among the first to N-th dedicated areas,
wherein the processor allocates differently each of sizes of the first to N-th dedicated areas according to a number of times each of the first to N-th meta data has been accessed by the requests.

12. The storage device of claim 11, wherein the sizes of the first to N-th dedicated areas are determined according to a pattern in which the first to N-th meta data are accessed.

13. The storage device of claim 11, wherein the sizes of the first to N-th dedicated areas are determined according to an access probability of each of the first to N-th meta data.

14. The storage device of claim 11, wherein the sizes of the first to N-th dedicated areas are proportional to a number of accesses of each of the first to N-th meta data.

15. The storage device of claim 11, wherein the sizes of the first to N-th dedicated areas are inversely proportional to a number of accesses of each of the first to N-th meta data.

16. The storage device of claim 11, wherein the sizes of the first to N-th dedicated areas are proportional to sizes of the first to N-th meta data, respectively.

17. The storage device of claim 11, wherein the sizes of the first to N-th dedicated areas are inversely proportional to sizes of the first to N-th meta data, respectively.

18. The storage device of claim 11, wherein the volatile main memory is a dynamic random access memory.

19. The storage device of claim 11, further comprising:
the non-volatile memory configured to store the first to N-th meta data,
wherein the non-volatile memory is a NAND flash memory.

* * * * *